(12) United States Patent
Chen

(10) Patent No.: US 6,374,694 B1
(45) Date of Patent: Apr. 23, 2002

(54) HAND BRAKE DEVICE

(75) Inventor: Chi-Shen Chen, Taoyuan (TW)

(73) Assignee: ENSD Corporation (TW)

( * ) Notice: Subject to any disclaimer, the term of this patent is extended or adjusted under 35 U.S.C. 154(b) by 0 days.

(21) Appl. No.: 09/630,368

(22) Filed: Aug. 1, 2000

(30) Foreign Application Priority Data

Aug. 3, 1999 (TW) ..................................... 88213081 U

(51) Int. Cl.[7] ................................................. F16C 1/12
(52) U.S. Cl. ......................... 74/502.2; 74/489; 74/526; 74/529; 74/536
(58) Field of Search ............................... 74/489, 502.2, 74/526, 529, 536, 537

(56) References Cited

U.S. PATENT DOCUMENTS

| | | | | |
|---|---|---|---|---|
| 2,530,030 A | * | 11/1950 | Robertshaw | 74/536 |
| 2,784,770 A | * | 3/1957 | Herr | 74/536 |
| 5,464,235 A | * | 11/1995 | Goldman et al. | 74/502.2 |
| 5,865,065 A | * | 2/1999 | Chiu | 74/502.2 |
| 5,904,069 A | * | 5/1999 | Rau et al. | 74/502.2 |
| 6,202,502 B1 | * | 3/2001 | Chung-Che | 74/502.2 |

* cited by examiner

Primary Examiner—Thomas R. Hannon
Assistant Examiner—Chong H. Kim
(74) Attorney, Agent, or Firm—Bacon & Thomas, PLLC

(57) ABSTRACT

A hand brake device for a wheelchair comprising a hand brake device on either handlebar and an associated brake provided on wheel. The hand brake device comprises a body member, a brake lever, and an actuator. Brake lever is coupled to brake cable. Body member comprises an open space with two extended opposite curve members of brake lever received therein, and a recess pivoted about a bolt. Operator may grip lever member to pivot brake lever so as to move toward or away from handlebar, thus tautening the brake cable for braking. A stopper member is inserted into channel of opening on the side of body member. When the brake lever is pulled toward or pushed away from the handle, the brake cable is tautened for braking the vehicle such that the stopper member clears from the channel. Further, pulls or pushes the actuator to cause the end of the stopper member to be clung between the dents, thereby locking the vehicle.

5 Claims, 8 Drawing Sheets

HAND BRAKE DEVICE

FIELD OF THE INVENTION

The present invention relates to brakes and more particularly to a hand brake device especially for wheelchair.

BACKGROUND OF THE INVENTION

Wheelchairs have been widely used for handicapped people as a convenient vehicle. In many wheelchairs a brake is provided for emergency. Conventionally, operator grasps brake lever to pivot with respect to handlebar for effecting a brake. At this condition, an instantaneous forward movement of wheelchair may occur when operator leaves the passenger. This is disadvantageous. Also, a locking device is provided around wheel. Operator has to bend his/her back to manipulate the locking device. In view of this, it is not convenient. An improvement is proposed wherein operator may pull the brake to effect a hand brake, while push the brake to effect a lock. But, such brake device is activated in a sequence, i.e., first release brake and then actuate the locking in a reverse direction. In the moment of transition, wheelchair may move instantaneously. This is dangerous especially in a slope.

Thus, it is desirable to provide an improved hand brake device in order to overcome the above drawbacks of prior art.

SUMMARY OF THE INVENTION

It is an object of the present invention to provide a hand brake device mountable on a vehicle such as wheelchair or the like. In the same orientation, the brake lever is capable of pivoting toward handlebar to effect a brake while moving on the ground or pivoting away from handlebar to effect a locking on vehicle while parking. In detail, use hand to pull or push brake lever to pivot for effecting the brake. In this state, then use finger to pull or push an actuator to pivot the actuator to a predetermined position thus locking the vehicle. In unlocking the vehicle, return the actuator to its original position and then release brake lever.

To achieve the above and other objects, the present invention provides a hand brake mechanism mountable on a wheeled vehicle comprising a hand brake device provided on either handlebar and an associated brake provided on wheel. The hand brake device comprises a brake lever including a first hole for anchoring a brake cable, two extended opposite curve members, two opposed recesses, an aperture, a second hole, and a generally half circular groove around the second hole; a body member including a lateral through hole on the upper part for permitting the handle to insert into, an open space with the curve members of the brake lever received therein, two elongate bars received in the open space to serve as pivot of the recesses, a channel on a side, and two opposite dents on the sides of the channel; an actuator including a generally half-circular flange inserted into the groove, a stopper member inserted into the channel, a vertical lever, a slit, and a third hole; and a torsion spring having one end received in the slit and the other end inserted into the aperture, wherein when the brake lever is pulled toward or pushed away from the handle, the brake cable is tautened for braking the vehicle such that the stopper member clears from the channel, and further pulls or pushes the actuator to cause the end of the stopper member to be clung between the dents, thereby locking the vehicle.

The above and other objects, features and advantages of the present invention will become apparent from the following detailed description taken with the accompanying drawings.

DETAILED DESCRIPTION OF THE PREFERRED EMBODIMENTS

Figure 1:
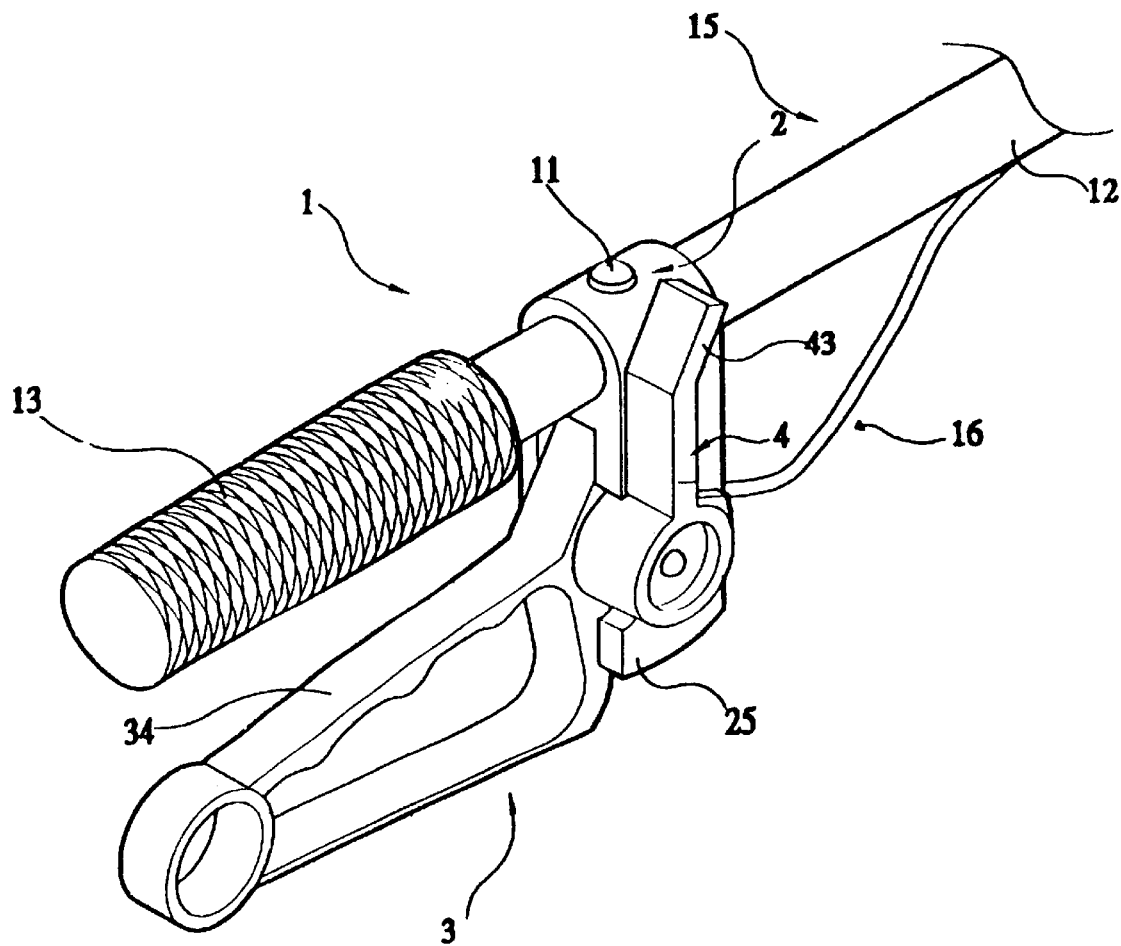
FIG. 1 is a perspective view of a hand brake device mounted on a vehicle according to the invention.
Figure 2:
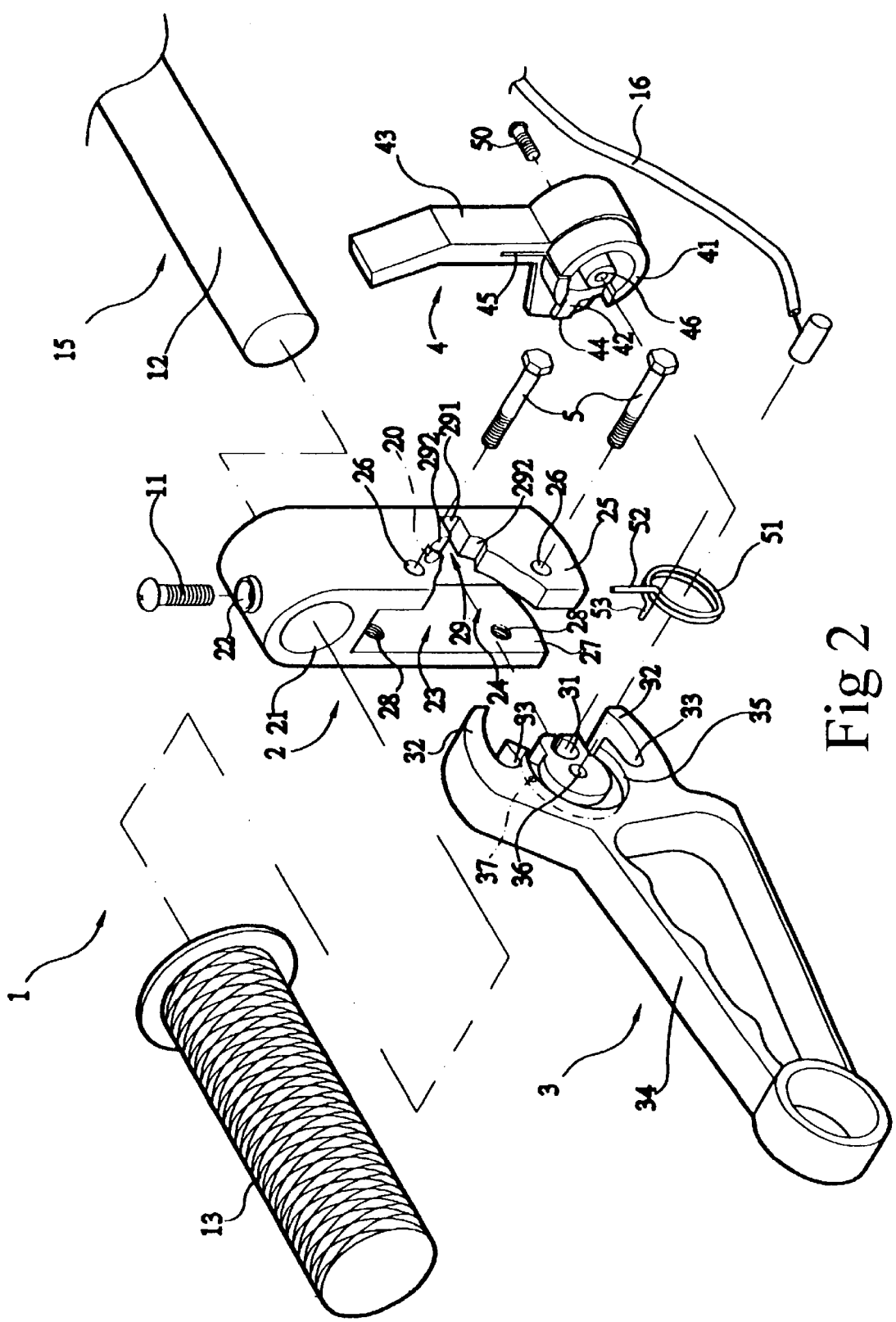
FIG. 2 is an exploded view of the FIG. 1 device.
Figure 3:
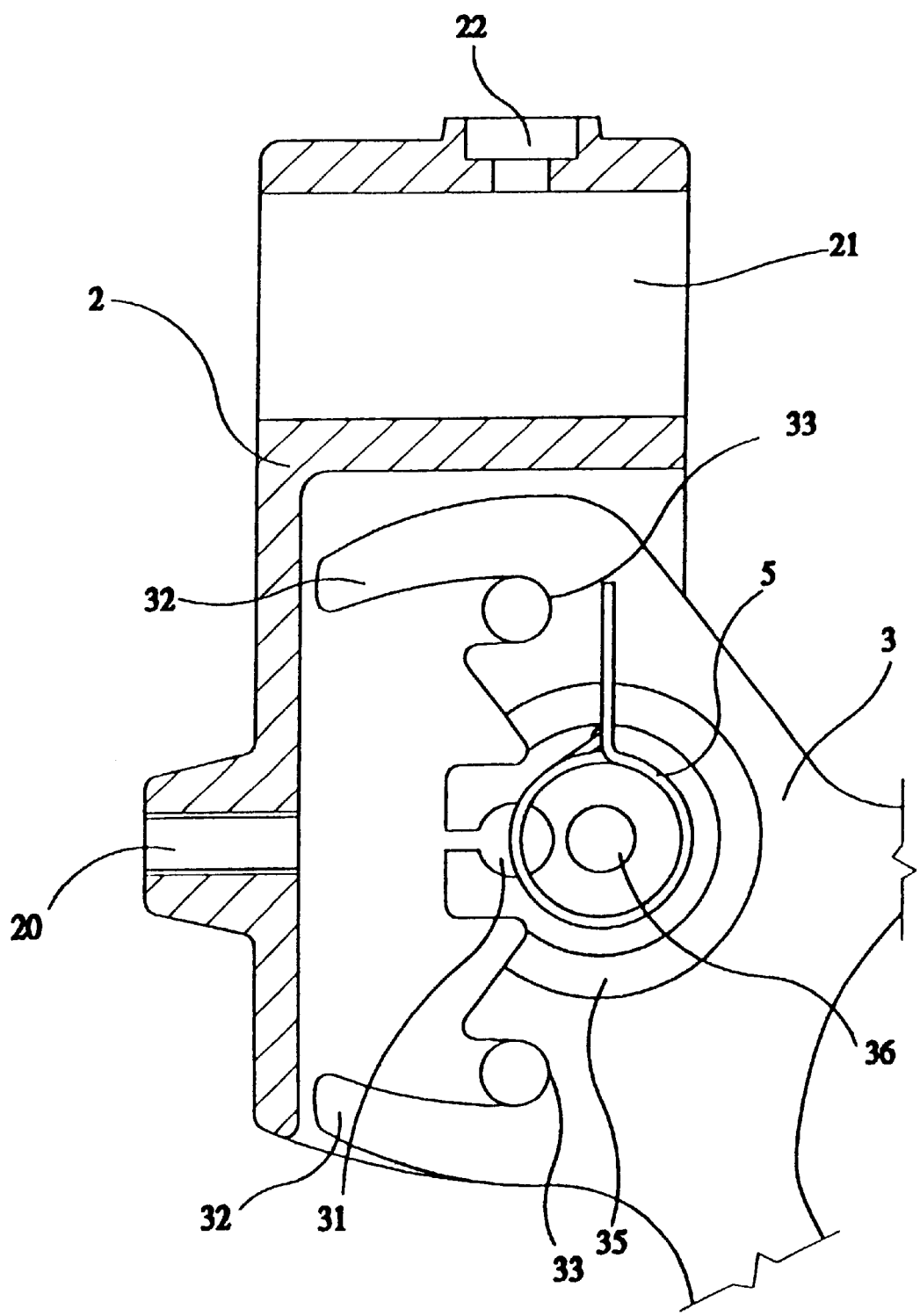
FIG. 3 is a partial cross-sectional view of the FIG. 1 device wherein only body member, brake lever, and spring are shown.
Figure 4:
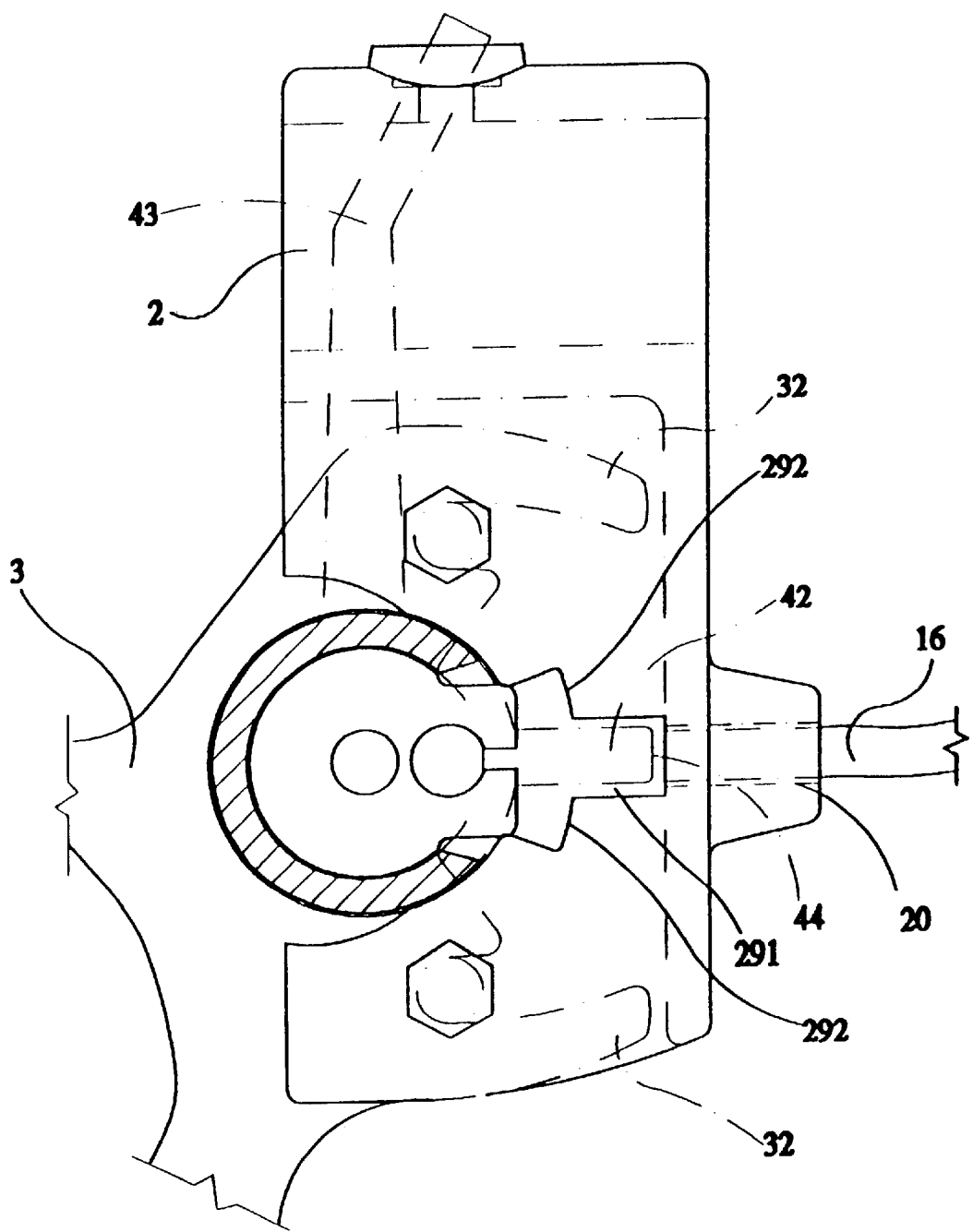
FIG. 4 is a schematic cross-sectional view showing the FIG. 1 device in an unlocked position.
Figure 5:
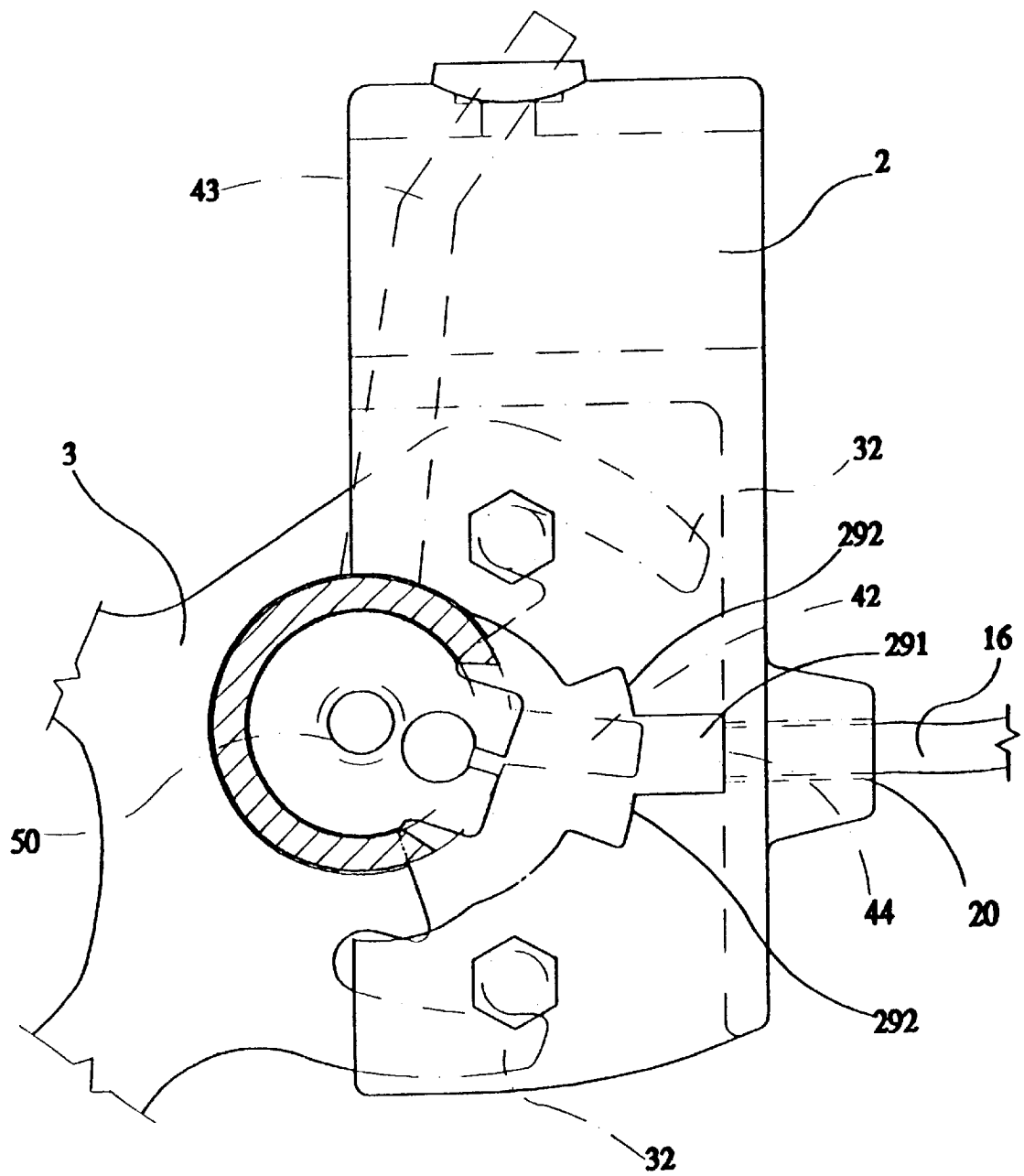
FIG. 5 is similar to FIG. 4 showing the FIG. 1 device in a locked position when brake lever pivots toward handlebar.
Figure 6:
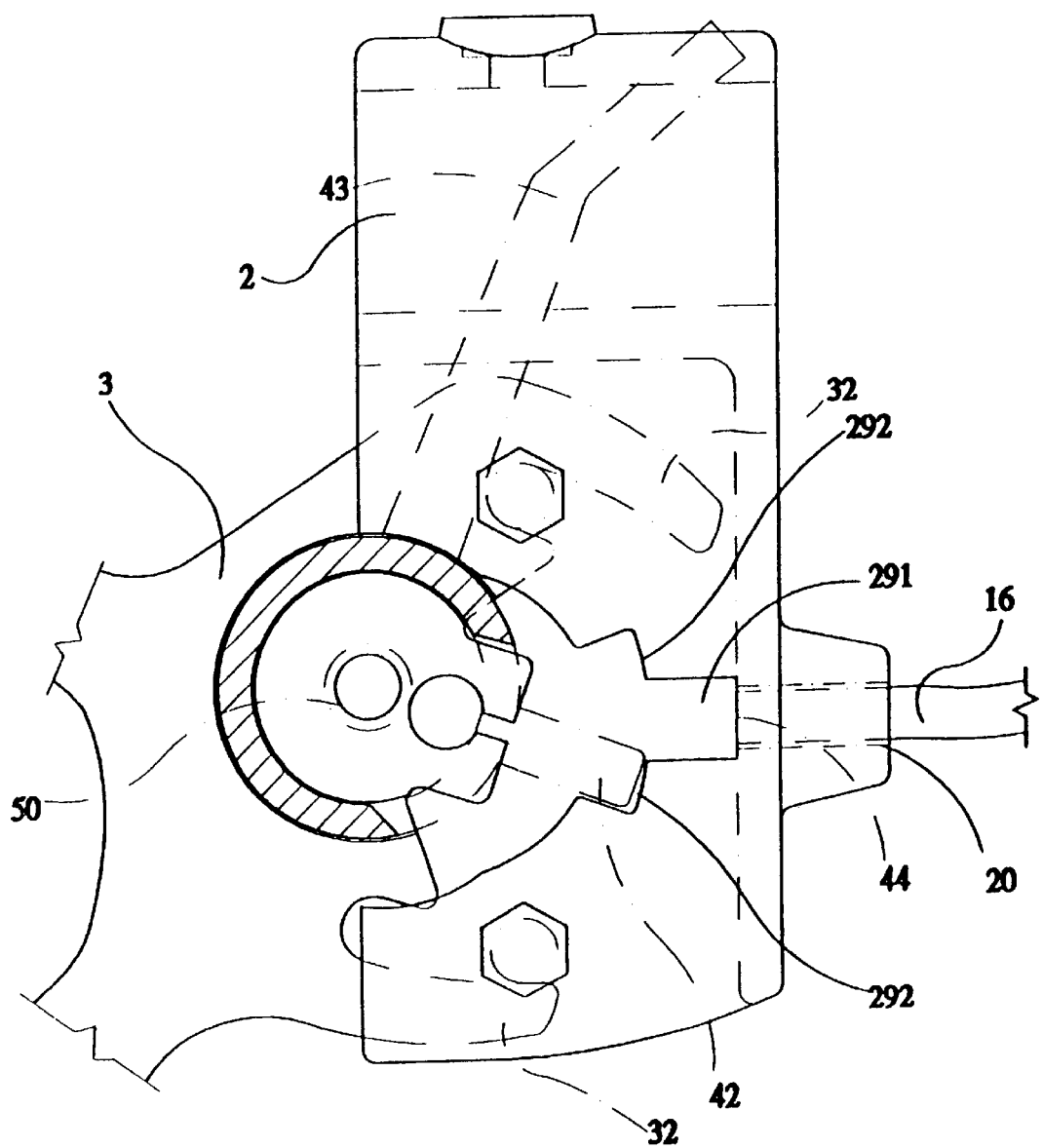
FIG. 6 is similar to FIG. 5 wherein actuator is also pivoted in the locked position.
Figure 7:
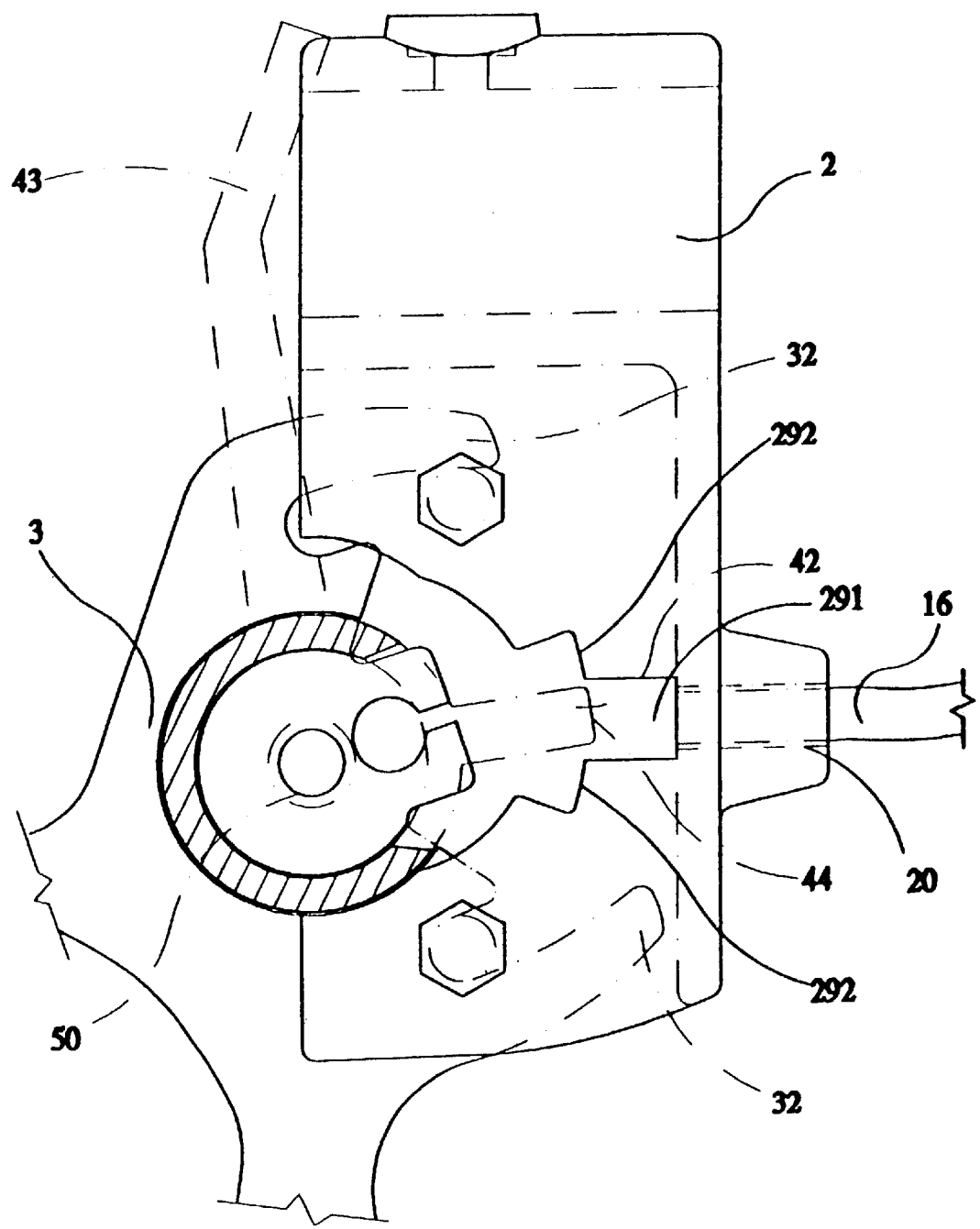
FIG. 7 is similar to FIG. 4 showing the FIG. 1 device in a locked position when brake lever pivots away from handlebar.

Referring to FIGS. 1 to 3, there is shown a hand brake mechanism mountable on a wheeled vehicle comprising a hand brake device 1 is provided on either handlebar 13 on the end of handle 15 and an associated brake is provided on wheel. The hand brake device 1 comprises a body member 2, a brake lever 3, and an actuator 4. Brake lever 3 comprises a hole 31 on the internal end with one end of brake cable 16 anchored therein. Note that the other end of brake cable 16 is coupled to the brake on wheel not further shown. Body member 2 comprises a lateral through hole 21 on the upper part for permitting the bar 12 of handle 15 to pass through to insert into handlebar 13 a selected distance, a vertical hole 22 with screw 11 threaded through to contact the bar 12 so as to secure handle 15 to body member 2, an opening 23 on the external side, and a space 24 open to the opening 23 with two extended opposite curve members 32 of brake lever 3 received therein. Bolts 5 are driven through holes 26 on the rear side 25, through two recesses 33 adjacent curve members 32 and through holes 28 on the front side 27 of body member 2. One portion of the shank of bolt 5 is smooth such that recess 33 may pivot about the smooth portion of bolt 5. Operator may grip the hollow lever member 34 to pivot brake lever 3 so as to move toward or away from handlebar 13. In the case of either toward or away from handlebar 13, brake cable 16 is always tautened, thereby braking the vehicle. A generally half-circular groove 35 is provided around the hole 36. A generally half-circular flange 41 is inserted into groove 35. A stopper member 42 is inserted into channel 291 of opening 29 on the side of body member 2. When brake lever 3 is in a hand brake position, stopper member 42 clears from channel 291. In pulling/pushing lever 43 of actuator 4, the end 44 of stopper member 42 is also pivoted. As such, end 44 of stopper member 42 is clung between the dents 292 on the external sides of channel 291, resulting in a locking of vehicle. Lever member 34 is formed to ease of grasping by hand. A center hole 36 is enclosed by groove 35. A bolt 50 is passed through hole 46 and center hole 36 to secure therein. A torsion spring 51 is provided between actuator 4 and brake lever 3. One end 52 of spring 51 is received in slit 45, while the other end 53 is inserted into aperture 37. As such, actuator 4 may return to its original position by virtue of spring 51 after actuator 4 is free from applied force. Then release brake lever 3 to return to the normal operating position of vehicle.

Referring to FIGS. 4 to 7, the operation of the invention will now be described. In pivoting brake lever 3 toward handlebar 13 (i.e., from the position shown in FIG. 4 to FIG. 5), a pulling of hand brake is effected. To the contrary in pivoting brake lever 3 away from handlebar 13 (i.e., from the position shown in FIG. 4 to FIG. 7), a pushing of hand brake is effected. In pulling brake lever 3, upper bolt 5 is the pivot center such that the lower curve member 32 moves outward. To the contrary, in pushing brake lever 3, lower bolt 5 is pivot center such that the upper curve member 32 moves outward. Also, a brake is effected when brake cable 16 is pulled a predetermined distance. Thus the invention can effect a brake in either direction (i.e., clockwise or counterclockwise).

Figure 8:
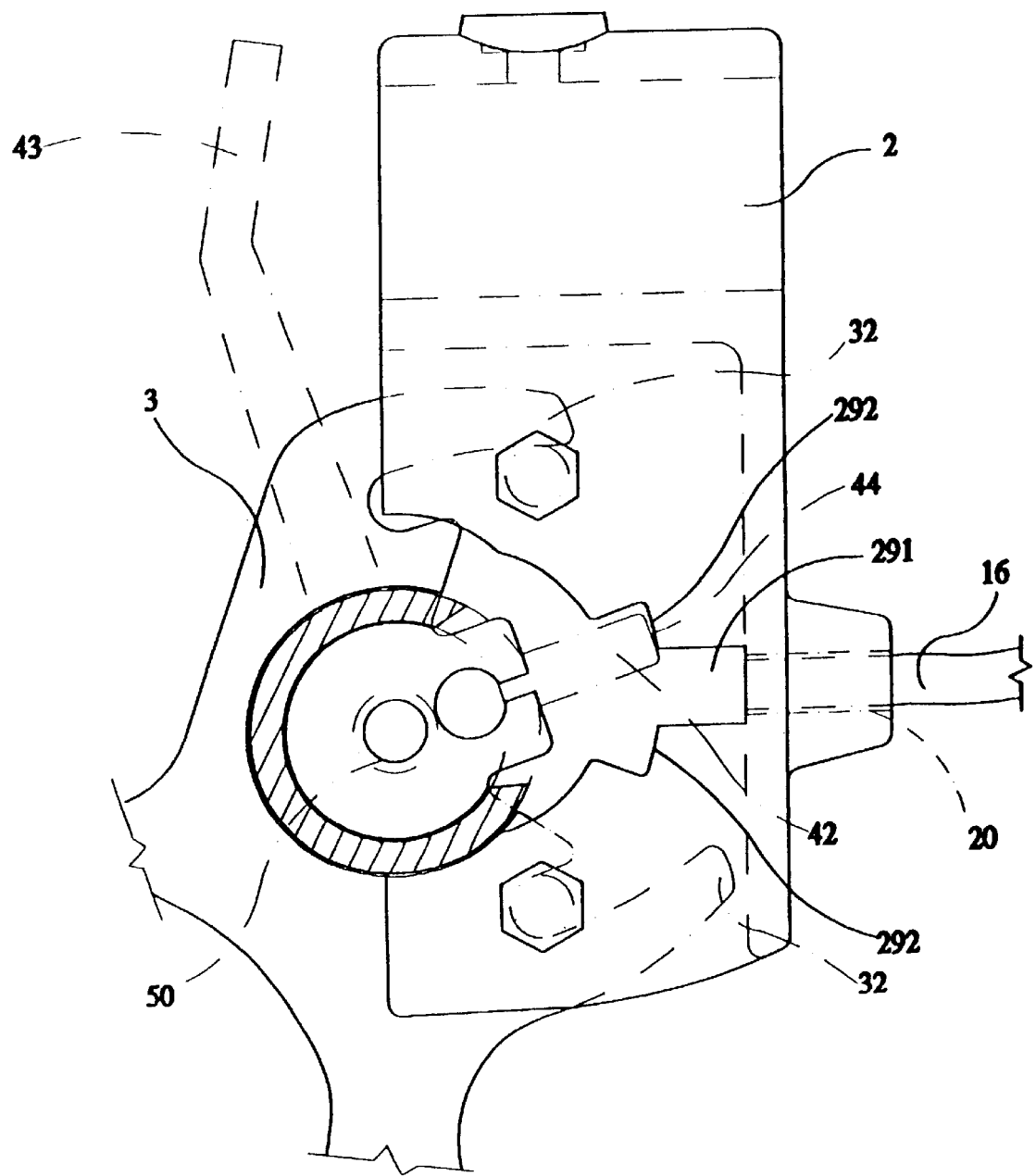
FIG. 8 is similar to FIG. 7 wherein actuator is also pivoted in the locked position.

As to the locking of vehicle, actuator 4 is in a free rotation state due to the provision of brake lever 3. Stopper member 42 is inserted into channel 291 of opening 29 on the side of body member 2. Actuator 4 is locked when brake lever 3 is in the above position. As such, it is required to move stopper member 42, actuator 4, and brake lever 3 together outward in order to release the locked actuator 4, i.e., actuator 4 is returned to pivot about bolt 5. In operation, use one hand to place brake lever 3 in a brake position. At the same time, push lever 43 of actuator 4 (FIG. 6), or pull it (the reverse direction of FIG. 6), or pull it (FIG. 8), or push it (the reverse direction of FIG. 8). As such, actuator 4 can pivot about bolt 50. Then end 44 of stopper member 42 is clung between the dents 292 on the external sides of channel 291, resulting in a locking of vehicle. At this time, operator may take fingers off to effect a lock of vehicle. This is similar to the situations of press brake pedal to effect a brake (i.e., temporarily) and pull the brake lever to effect a lock (i.e., permanently) in operating an automobile. Further, the provision of torsion spring may facilitate elder people to pull or push the locking device to effect a brake.

In brief, pull or push the brake lever 3 in the same direction to effect a brake. Then, again pull or push actuator 4 to effect a locking. Most importantly, it is not necessary to release brake in carrying out the locking of vehicle. That is, pull brake lever 3 and push actuator 4 to effect a brake (FIGS. 5 and 6), or push brake lever 3 and pull actuator 4 (FIGS. 7 and 8) to effect the locking of vehicle. Preferably, operator may effect a brake during moving on the ground and effect a locking when parking. Moreover, there is no transition delay, thus effecting a safe reliable vehicle.

While the invention herein disclosed has been described by means of specific embodiments, numerous modifications and variations could be made thereto by those skilled in the art without departing from the scope and spirit of the invention set forth in the claims.

What is claimed is:

1. A hand brake device mountable on either handle of a wheeled vehicle, comprising:

a brake lever including a first hole for anchoring a brake cable, two extended opposite curve members, two opposed recesses, an aperture, a second hole, and a generally half-circular groove around the second hole;

a body member including a lateral through hole on the upper part for permitting the handle to insert into, an open space with the curve members of the brake lever received therein, two elongate bars received in the open space to serve as pivot of the recesses, a channel on a side, and two opposite dents on the sides of the channel;

an actuator including a generally half-circular flange inserted into the groove, a stopper member inserted into the channel, a vertical lever, a slit, and a third hole; and a torsion spring having one end received in the slit and the other end inserted into the aperture, wherein when the brake lever is pulled toward or pushed away from the handle, the brake cable is tautened for braking the vehicle such that the stopper member clears from the channel, and further pulls or pushes the actuator to cause the end of the stopper member to be clung between the dents, thereby locking the vehicle.

2. The device of claim 1, wherein the actuator further comprises a lever.

3. The device of claim 1, wherein the brake lever further comprises a hollow lever member.

4. The device of claim 1, wherein the bars comprise a smooth portion.

5. A hand brake device in combination with a handle of a wheelchair, the hand brake device comprising:

a brake lever including a first hole for anchoring a brake cable, two extended opposite curve members, two opposed recesses, an aperture, a second hole, and a generally half-circular groove around the second hole;

a body member including a lateral through hole on the upper part for permitting the handle to insert into, an open space with the curve members of the brake lever received therein, two elongate bars received in the open space to serve as pivot of the recesses, a channel on a side, and two opposite dents on the sides of the channel;

an actuator including a generally half-circular flange inserted into the groove, a stopper member inserted into the channel, a vertical lever, a slit, and a third hole; and a torsion spring having one end received in the slit and the other end inserted into the aperture, wherein when the brake lever is pulled toward or pushed away from the handle, the brake cable is tautened for braking the vehicle such that the stopper member clears from the channel, and further pulls or pushes the actuator to cause the end of the stopper member to be clung between the dents, thereby locking the vehicle.

* * * * *